United States Patent
Kim et al.

(10) Patent No.: US 10,098,148 B2
(45) Date of Patent: Oct. 9, 2018

(54) METHOD OF CONTROL INFORMATION IN WIRELESS COMMUNICATION SYSTEM

(71) Applicant: LG ELECTRONICS INC., Seoul (KR)

(72) Inventors: Bong Hoe Kim, Seoul (KR); Dae Won Lee, Sungnam-si (KR); Yu Jin Noh, Seoul (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 14/700,893

(22) Filed: Apr. 30, 2015

(65) Prior Publication Data

US 2015/0296537 A1    Oct. 15, 2015

Related U.S. Application Data

(63) Continuation of application No. 13/128,623, filed as application No. PCT/KR2009/007143 on Dec. 2, 2009, now Pat. No. 9,048,885.

(60) Provisional application No. 61/120,026, filed on Dec. 4, 2008.

(30) Foreign Application Priority Data

Nov. 27, 2009    (KR) .................. 10-2009-0115738

(51) Int. Cl.
*H04W 4/00* (2018.01)
*H04W 74/00* (2009.01)
(Continued)

(52) U.S. Cl.
CPC .......... *H04W 74/006* (2013.01); *H04B 7/024* (2013.01); *H04L 5/0055* (2013.01);
(Continued)

(58) Field of Classification Search
None
See application file for complete search history.

(56) References Cited

U.S. PATENT DOCUMENTS 6,665,521 B1   12/2003  Gorday et al.
9,048,885 B2 *  6/2015  Kim .................. H04B 7/024
(Continued)

FOREIGN PATENT DOCUMENTS

KR    1020070121589    12/2007
KR    1020080076662    8/2008

OTHER PUBLICATIONS

Ericsson, "LTE-Advanced—Coordinated Multipoint transmission/reception," R1-082469, TSG-RAN WG1 #53bis, Jun. 2008, 6 pages.
(Continued)

*Primary Examiner* — Jutai Kao
(74) *Attorney, Agent, or Firm* — Lee, Hong, Degerman, Kang & Waimey (57) ABSTRACT

A method of transmitting control information in a wireless communication system is disclosed. A method of receiving control information in a mobile station which receives downlink data from a plurality of cells simultaneously in a wireless communication system comprises receiving downlink control information including the control information on data transmitted from the plurality of cells from a serving base station via a downlink control channel.

8 Claims, 6 Drawing Sheets

(51) Int. Cl.
  *H04B 7/024* (2017.01)
  *H04L 5/00* (2006.01)
  *H04W 72/04* (2009.01)
  *H04W 48/16* (2009.01)
  *H04B 7/0417* (2017.01)
  *H04B 7/06* (2006.01)
  *H04W 52/42* (2009.01)
  *H04W 88/08* (2009.01)

(52) U.S. Cl.
  CPC ....... *H04W 72/0406* (2013.01); *H04B 7/0417* (2013.01); *H04B 7/0669* (2013.01); *H04W 48/16* (2013.01); *H04W 52/42* (2013.01); *H04W 88/08* (2013.01)

(56) References Cited

U.S. PATENT DOCUMENTS

| | | | |
|---|---|---|---|
| 2008/0090573 A1 | 4/2008 | Kim et al. | |
| 2008/0153495 A1* | 6/2008 | Ogami | H04W 36/30 455/436 |
| 2008/0310540 A1* | 12/2008 | Tiirola | H04J 13/00 375/267 |
| 2008/0311942 A1 | 12/2008 | Kim et al. | |
| 2009/0241004 A1* | 9/2009 | Ahn | H04L 1/1812 714/749 |
| 2010/0027471 A1* | 2/2010 | Palanki | H04B 7/024 370/328 |
| 2010/0056215 A1 | 3/2010 | Gorokhov et al. | |
| 2010/0103821 A1* | 4/2010 | Palanki | H04W 36/0055 370/241 |
| 2010/0279695 A1* | 11/2010 | Amirijoo | H04W 36/0055 455/438 |
| 2011/0199997 A1* | 8/2011 | Wennstrom | H04L 1/1607 370/329 |
| 2013/0242944 A1* | 9/2013 | Cave | H04W 36/18 370/331 |

OTHER PUBLICATIONS

Song, et al., "Collaborative MIMO," IEEE 802.16 Broadband Wireless Access Working Group, IEEE C802.16m-07/244r1, Nov. 2007, 9 pages.

* cited by examiner

METHOD OF CONTROL INFORMATION IN WIRELESS COMMUNICATION SYSTEM

CROSS-REFERENCE TO RELATED APPLICATIONS

This application is continuation of U.S. patent application Ser. No. 13/128,623, filed on May 10, 2011, now U.S. Pat. No. 9,048,885, which is a 371 U.S. national stage application of International Application No. PCT/KR2009/007143, filed on Dec. 2, 2009, which claims the benefit of earlier filing date and right of priority to Korean Application No. 10-2009-0115738, filed on Nov. 27, 2009, and also claims the benefit of U.S. Provisional Application No. 61/120,026, filed on Dec. 4, 2008, the contents of which are all incorporated by reference herein in their entirety.

TECHNICAL FIELD

The present invention relates to a wireless communication system, and more particularly, to a method of transmitting control information in a wireless communication system.

BACKGROUND ART

Generally, MIMO (multi-input multi-output) technique means a method of improving transceived data efficiency by adopting multiple transmitting antennas and/or multiple receiving antennas instead of a single transmitting antenna and a single receiving antenna. Namely, the MIMO technique is the technique for a transmitting or receiving side of a wireless communication system to attempt capacity increase or performance enhancement using the multiple antennas.

The MIMO technique is the technique for receiving one whole message in a manner that pieces of data segments received via plural antennas are put together to complete the whole message. The MIMO antenna improves a data transmission rate within a specific range or extends a system range for a specific data transmission rate, thereby being widely applicable to a mobile communication terminal, a relay and the like. Many attentions are paid to the MIMO technique as a next generation technology capable of overcoming the transmission size limit of the mobile communication which almost reaches a dead end due to data communication expansion and the like.

Figure 1:
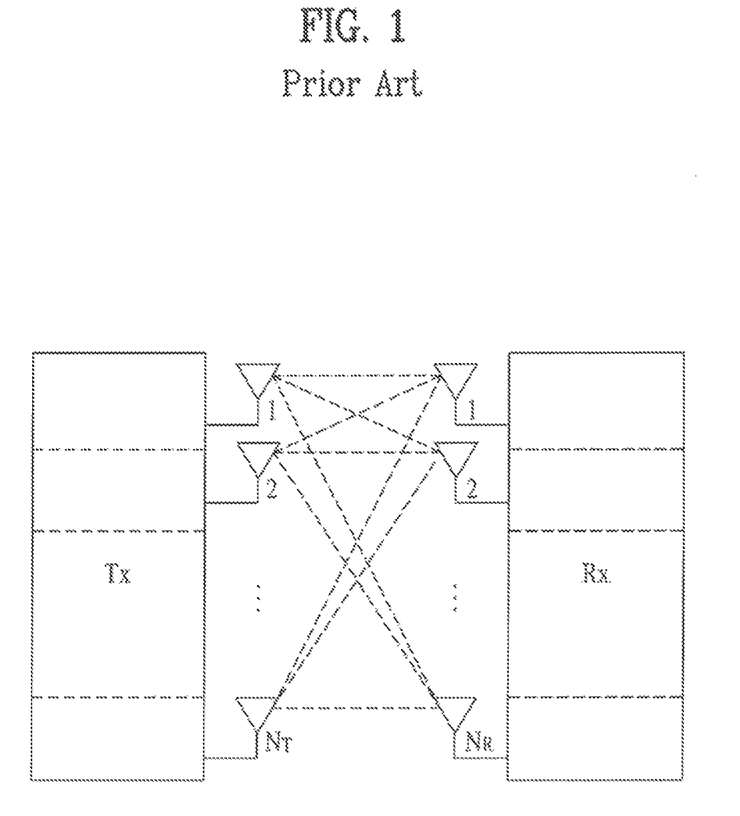
FIG. 1 is a diagram for a configuration of an MIMO communication system according to a related art.

FIG. 1 is a diagram for a configuration of an MIMO communication system according to a related art. Referring to FIG. 1, if the number of transmitting antennas is incremented into $N_T$ and the number of receiving antennas is simultaneously incremented into $N_R$, theoretical channel transmission capacity is increased in proportion to the number of antennas unlike the case that a transmitter or receiver uses a plurality of antennas. Hence, a transmission rate is enhanced and frequency efficiency can be remarkably raised. The transmission rate according to the increase of the channel transmission capacity can be theoretically raised in a manner that a maximum transmission rate $R_0$ of the case of using a single antenna by a rate increasing rate $R_i$ of Formula 1.

$$R_i = \min(N_T, N_R) \quad \text{[Formula 1]}$$

For instance, an MIMO communication system, which uses 4 transmitting antennas and 4 receiving antennas, is able to obtain a transmission rate 4 times higher than that of a single antenna system. After this theoretical capacity increase of the MIMO system has been proved in the middle of 90's, many efforts are ongoing to be made to various techniques to drive it into substantial data rate improvement. Some of theses techniques are already adopted as standards for the 3G mobile communications and various wireless communications such as a next generation wireless LAN and the like.

The trends for the MIMO relevant studies are explained as follows. First of all, many efforts are ongoing to be made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows.

First of all, a transmission signal is explained. If there are $N_T$ transmitting antennas, $N_T$ maximum transmittable informations exist. Hence, it can be represented by the vector shown in Formula 2.

$$s = [s_1, s_2, \ldots, s_{N_T}]^T \quad \text{[Formula 2]}$$

Meanwhile, transmission power can be set different for each transmission information. If the respective transmission powers are set to $P_1, P_2, \ldots, P_N$, the transmission power adjusted transmission information can be represented by Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, the transmission power adjusted transmission information vector can be represented by Formula 4 on a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If the transmission power adjusted transmission information vector is multiplied by a weight matrix W, $N_T$ transmission signals are generated. In this case, the weight matrix is the matrix that plays a role in properly distributing each transmission information to each antenna according to a channel status and the like and is also called a precoding matrix.

If the $N_T$ transmission signals are set to $x_1, x_2, \ldots, x_{N_T}$, a transmission signal vector x can be represented by Formula 5. In Formula 5, $w_{ij}$ indicates a weight between an $i^{th}$ transmitting antenna and a $j^{th}$ information.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Formula 5]}$$

$$W\hat{s} = WPs$$

In the following description, a reception signal is explained. When $N_R$ receiving antennas exist, if reception signals of the receiving antennas are set to $y_1, y_2, \ldots, y_{N_R}$, a reception signal vector can be represented by Formula 6.

$$y = [y_1, y_2, \ldots, y_{N_R}]^T \quad \text{[Formula 6]}$$

In a wireless communication system using MIMO antenna, a channel can be represented by an index of a transmitting antenna and an index of a receiving antenna. A channel between a transmitting antenna j and a receiving antenna I can be represented by $h_{ij}$. This channel can be represented by a vector or matrix in a manner of tying channels between a plurality of transmitting antennas and a plurality of receiving antennas together.

Figure 2:
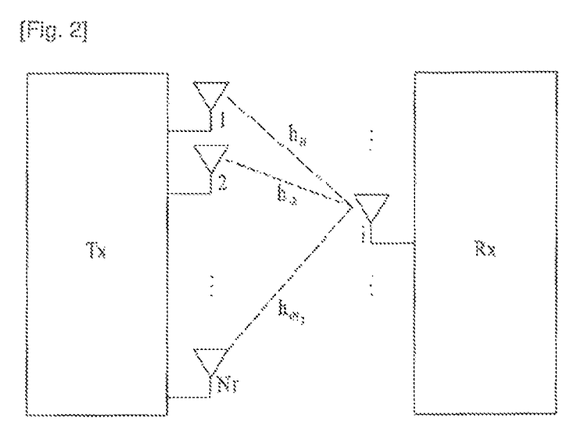
FIG. 2 is a diagram of channels between a receiving antenna i and $N_T$ transmitting antennas, respectively.

FIG. 2 is a diagram of channels between a receiving antenna i and $N_T$ transmitting antennas, respectively.

Referring to FIG. 2, the channels between the receiving antenna i and $N_T$ transmitting antennas can be represented by a vector expressed as Formula 7.

$$h_i^T = [h_{i1}, h_{i2}, \ldots, h_{iN_T}] \quad \text{[Formula 7]}$$

And, channels between $N_T$ transmitting antennas and $N_R$ relieving antennas can be expressed as the matrix shown in Formula 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Formula 8]}$$

A transmission signal passes through a channel and then has AWGN (additive white Gaussian noise) added thereto. If so, a reception signal is the signal. If white noses added to receptions signals received by $N_R$ receiving antennas are set to $n_1, n_2, \ldots, n_{N_R}$, respectively, a white noise vector can be represented by Formula 9.

$$n = [n_1, n_2, \ldots, n_{N_R}]^T \quad \text{[Formula 9]}$$

Hence, a reception signal vector can be expressed as Formula 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Formula 10]}$$

$$Hx + n$$

An MIMO system can be categorized into a space multiplexing scheme and a space diversity scheme according to a presence or non-presence of the same data transmission.

The space multiplexing scheme means the scheme for transmitting data at high speed by transmitting different data via a plurality of transmitting antennas simultaneously without increasing a bandwidth. The space diversity scheme means the scheme for obtaining transmission diversity by transmitting the same data via a plurality of transmitting antennas. Space time channel coding is an example for the space diversity scheme.

The MIMO technique can be also categorized into an open loop scheme and a closed loop scheme according to a presence or non-presence of feedback of channel information to a transmitting side from a receiving side. The open loop scheme includes a space-time trellis code (STTC) scheme for obtaining a transmission diversity and coding gain using BLAST and space region capable of extending an information size amounting to the number of transmitting antennas in a manner that a transmitting side transmits information in parallel and that a receiving side detects a signal using ZF (zero forcing) and MMSE (minimum mean square error) scheme repeatedly. And, the closed loop scheme includes a TxAA transmit antenna array scheme or the like.

Figure 3:
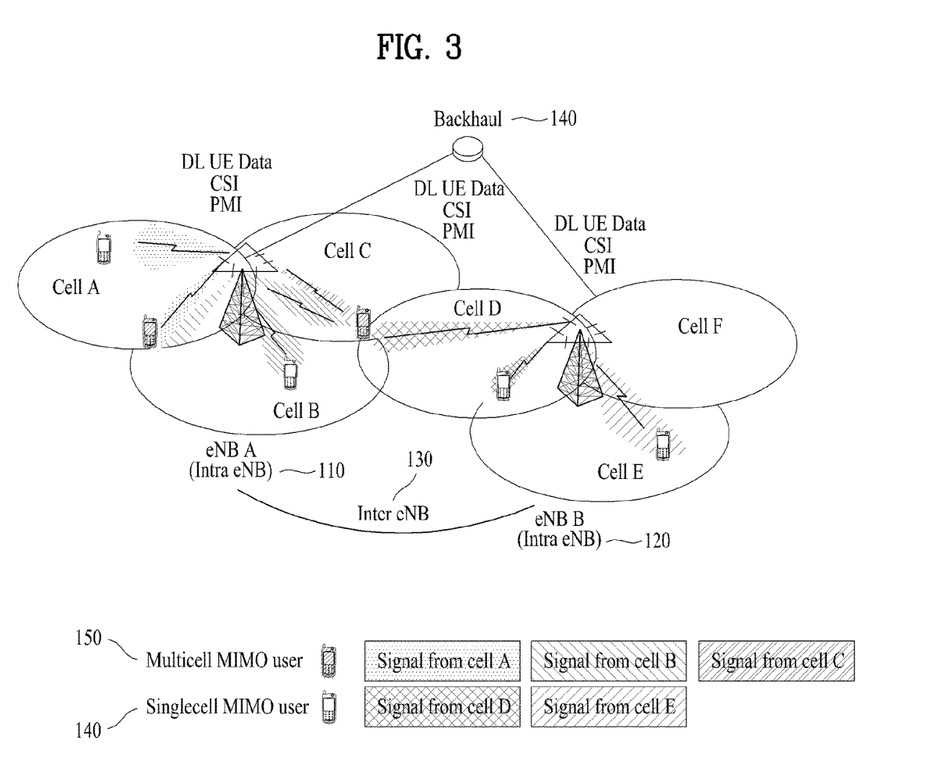
FIG. 3 is a conceptional diagram for CoMP (coordinated multi-point) of an intra eNB and an inter eNB according to a related art.

FIG. 3 is a conceptional diagram for CoMP (coordinated multi-point) of an intra eNB and an inter eNB according to a related art.

Referring to FIG. 3, intra eNBs 310 and 320 and an inter eNB 330 exist in a multi-cell environment. In LTE (long term evolution) system, an intra eNB is constructed with several cells or sectors. Generally, physically co-located cells are called intra cells and cells in different locations are called inter cells, respectively. A single cell MIMO user within a single cell communicates with one serving cell in one cell (sector). A multi-cell user located on a cell boundary is able to communicate with a plurality of serving base stations in a multi-cell (multi-sector).

A coordinated multi-point (CoMP) system (hereinafter abbreviated CoMP system) is the system to improve data transmission efficiency of a user located on a cell boundary by applying enhanced MIMO transmission in a multi-cell environment. If the CoMP system is applied, it is able to reduce inter-cell interference in the multi-cell environment. If the CoMP system is used, a mobile station can be provided with a support from multi-cell base stations jointly. Moreover, each base station is able to enhance system performance by supporting at least one or more mobile stations MS1, MS2, . . . MSK simultaneously using the same radio frequency resource. Namely, the base station is able to perform space division multiple access (SDMA) method based on status information of a channel between the base station and the mobile station.

The CoMP scheme can be categorized into a joint processing scheme through data sharing and a coordinated scheduling scheme/beamforming scheme.

In a CoMP system, a serving base station and at least one or more coordinated base stations are connected to a scheduler via a wired/wireless network. The scheduler is able to operate by receiving feedback of channel information on a channel status between each mobile station (MS1, MS2, . . . MSK) and the coordinated base station.

In a wireless communication system, a base station transmits downlink control information to a mobile station. The mobile station transmits uplink control information to the base station. Therefore, the demand for a method of transmitting control information in a CoMP system is ongoing to rise.

DISCLOSURE

Technical Problem

However, as mentioned in the foregoing description, as a CoMP system is introduced, the demand for a method of transmitting control information in a CoMP system rises.

Accordingly, the present invention is directed to a method of transmitting control information in a wireless communication system that substantially obviates one or more of the problems due to limitations and disadvantages of the related art.

An object of the present invention is to provide a method of transmitting control information in a wireless communication system, in which the wireless communication system operates in CoMP mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

In order to solve the above technical problems, a method of receiving control information in a mobile station which receives downlink data from a plurality of cells simultaneously in a wireless communication system comprises receiving downlink control information including the control information on data transmitted from the plurality of cells from a serving base station via a downlink control channel.

Preferably, the mobile station receives the downlink data from the plurality of cells and is able to transmit ACK/NACK for the downlink data using a cyclic shift value determined according to a first CCE index of the downlink control channel and a base sequence of the serving base station.

Preferably, the method further includes the step of transmitting a CQI of a downlink channel of each of the plurality of cells using a base sequence of the serving base station and a cyclic shift value reserved by the serving base station in advance.

Preferably, the downlink control information includes information on a cell having a best downlink channel status among the plurality of cells and the mobile station is able to receive the downlink data from the cell having the best downlink channel status.

In order to solve the above technical problems, a method of receiving control information of a mobile station operating in a CoMP mode in a wireless communication system includes transmitting information on a base station having a best downlink channel status among a plurality of base stations coordinated in the CoMP mode of the mobile station using an index of a precoding matrix and receiving downlink control information from the base station having the best channel status via a downlink control channel.

Preferably, the mobile station receives downlink data from the base station having the best channel status and is able to transmit ACK/NACK for the downlink data using a cyclic shift value determined according to a first CCE index of the downlink control channel and a base sequence of the base station having the best channel status.

In order to solve the above technical problems, a method of transmitting control information of a serving base station in a wireless communication system includes transmitting downlink control information including the control information on data transmitted from a plurality of cells to a mobile station receiving downlink data from the plurality of cells simultaneously via a downlink control channel.

Preferably, the serving base station transmits the downlink data to the mobile station and is able to receive ACK/NACK for the downlink data using a cyclic shift value determined according to a first CCE index of the downlink control channel and a base sequence of the serving base station.

Preferably, the serving base station is able to receive a CQI of a downlink channel of each of the plurality of cells from the mobile station using a base sequence of the serving base station and a cyclic shift value reserved by the serving base station in advance.

It is to be understood that both the foregoing general description and the following detailed description are exemplary and explanatory and are intended to provide further explanation of the invention as claimed.

Advantageous Effects

According to embodiments of the present invention, a serving base station is enabled to transmit downlink control information to a mobile station, whereby a method of transmitting control information in a wireless communication system operating in CoMP mode is provided.

It is to be understood that the advantages that can be obtained by the present invention are not limited to the aforementioned advantages and other advantages which are not mentioned will be apparent from the following description to the person with an ordinary skill in the art to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting more vague, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal as a node B, eNode B, a base station and the like.

A base station transmits downlink control information to a mobile station via a physical downlink control channel (PDCCH). And, the mobile station transmits uplink control information to the base station via a physical uplink control channel (PUCCH). The downlink control information and the uplink control information are explained as follows.

First of all, the downlink control information includes control information on data transmitted in downlink or uplink. Therefore, a mobile station detects a downlink control channel and then determines whether there exists data to be transmitted to the mobile station or whether to transmit data. In general, a downlink control channel is transmitted each subframe. The mobile station activates a random function using a mobile station ID and then determines whether a downlink control channel is transmitted to the mobile station.

A base station generates a downlink control channel by having a basic unit set to a predetermined number of resources in a frequency region. In LTE system, 36 frequency region resources are set to one control channel element (hereinafter abbreviated CCE) and control information is then transmitted. In consideration of a data information size transmitted to a mobile station, a channel status, an operational mode and the like, plural CCEs are put together to transmit control information. In the LTE system, it is defined that control information can be transmitted by putting 1, 2, 4 or 9 CCEs together.

The downlink control information is interleaved in the frequency region to be transmitted on a whole downlink band. Since a processing capability of a mobile station is limited, it is substantially difficult to determine a presence or non-presence of a signal of the mobile station by discovering all locations of available downlink channels. Therefore, after a location for transmitting control information to the mobile station has been designated as a random function using a mobile station, the mobile station determines a presence or non-presence of a downlink control signal transmitted to itself for the corresponding location only.

The downlink control information can be divided into control information on downlink data and control information on uplink data. The control information on the downlink data includes information on resource allocation, information on modulation and coding, information on an HARQ (hybrid automatic repeat request) process, a new data indicator, information on a redundancy version, information on power control and the like. And, if MIMO antenna is supported, the control information on the downlink data additionally includes information related to precoding. And, the control information on the downlink data is defined different according to an operational mode.

The control information on uplink data includes information on resource allocation, hopping information, information on modulation and coding, information on an HARQ process, a new data indicator, power control information, information on a resource of a reference signal for demodulation, and a channel quality indicator (hereinafter abbreviated CQI) transmission request information.

And, the uplink control information includes ACK/NACK (acknowledge/non-acknowledge) for the data transmitted in downlink and CQI information indicating a downlink channel status.

The ACK/NACK is transmitted by CDM (code division multiplexing) used in a manner that plural users share a resource of a specific frequency region. If it is unable to accommodate a user in a specific frequency region, FDM (frequency division multiplexing) for further allocating a resource in a frequency region is additionally used. If the ACK/NACK is transmitted by code division multiplexing, CAZAC sequence is used. In doing so, a base sequence of a CAZAC sequence is identical in one cell. And, different mobile stations use different cyclic shift values, respectively. The cyclic shift value, which is to be used by the mobile station, is determined according to a first CCE index of the CCEs carrying the downlink control channel.

A base sequence of the CAZAC sequence used in transmitting the CQI is identical to the base sequence used in transmitting the ACK/NACK. And, a cyclic shift value to be used and a position of a frequency region are reserved in advance.

In the following description, a method of receiving control information according to a first embodiment of the present invention is explained with reference to FIG. 4.

Figure 4:
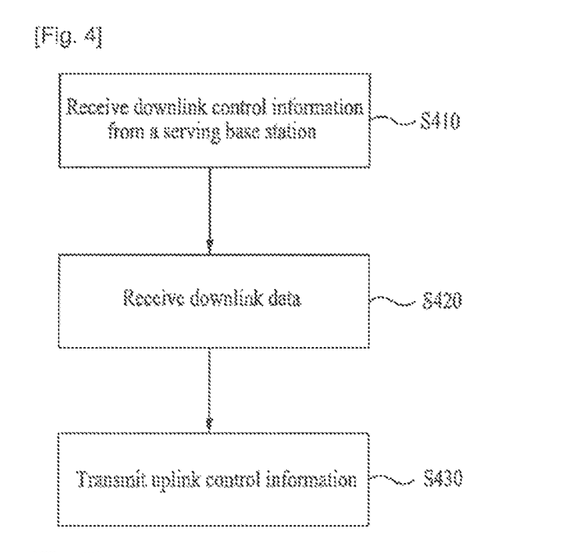
FIG. 4 is a flowchart for a method of receiving control information according to a first embodiment of the present invention.

FIG. 4 is a flowchart for a method of receiving control information according to a first embodiment of the present invention.

According to a first embodiment of the present invention, a mobile station receives downlink control information from one of a plurality of coordinated base stations. In this case, the base station, which transmits downlink control information, is named a serving base station. And, the serving station can be determined after an initial access of a mobile station. A plurality of the base stations in CoMP operation share data and scheduling information with each other. All the base stations coordinated in the CoMP mode of the mobile station can transmit the downlink data to the mobile station or at least one of the base stations coordinated in the CoMP mode of the mobile station can transmit the downlink data to the mobile station.

Referring to FIG. 4, a mobile station receives downlink control information from a serving base station [S410].

In this case, the mobile station searches downlink control channels of the serving base station only and then determines whether the downlink control channel for the mobile station only is transmitted. If a plurality of cells among cells coordinated in the CoMP mode of the mobile station transmit downlink data to the mobile station, the serving station transmits downlink control information on the downlink data transmitted to the mobile station from a plurality of the cells.

The control information transmitted to the mobile station can be transmitted via one downlink control channel or a plurality of downlink control channels. In particular, if there are two cells that transmit downlink data to the mobile station, control information on the data transmitted from one or two cells can be transmitted via one or two downlink control channels.

The mobile station receives the downlink data from at least one or more cells using the received downlink control channel(s) [S420].

Subsequently, the mobile station transmits uplink control information [S430]. In this case, the uplink control information includes ACK/NACK for the downlink data, a CQI indicating a channel status in downlink and a scheduling request (hereinafter abbreviated SR).

In case that a plurality of cells transmit downlink data to the mobile station, control information on the data transmitted from a plurality of the cells is transmitted via one control channel. This case is explained as follows.

First of all, the mobile station uses a base sequence of the serving base station as a base sequence of CAZAC sequence, determines a cyclic shift value using a first CCE index of the downlink control channel transmitted by the serving base station, and then transmits ACK/NACK for the received downlink data. And, a position of a frequency region used for the transmission of the ACK/NACK and an orthogonal cover are determined according to the first CCE index of the downlink control channel transmitted by the serving base station.

The mobile station uses the base sequence of the serving base station as the base sequence of the CAZAC sequence and then transmits the CQI and the SR via the position of the frequency region previously determined by the serving base station using the cyclic shift value previously reserved by the serving base station. In doing so, if the downlink data are received from a plurality of the cells, CQIs of the downlink channels of a plurality of the cells, which have transmitted the downlink data, are transmitted.

In the following description, explained is a case that control information on data transmitted to a mobile station from a plurality of cells is transmitted via a plurality of downlink control channels.

First of all, in transmitting ACK/NACK, the mobile station uses a base sequence of a serving base station as a base sequence of a CAZAC sequence and then determines a cyclic shift value, an orthogonal cover and a frequency region according to a first CCE index of a random one of a plurality of downlink control channels.

Subsequently, the mobile station uses the base sequence of the serving base station as the base sequence of the CAZAC sequence and uses the cyclic shift value previously reserved by the serving base station, thereby transmitting a CQI and an SR via the position of the frequency region designated by the serving base station in advance.

In the following description, a method of receiving control information according to a second embodiment of the present invention is explained with reference to FIG. 5.

Figure 5:
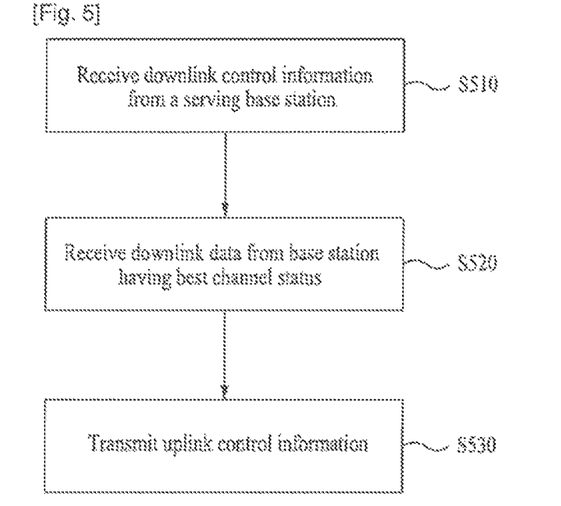
FIG. 5 is a flowchart for a method of receiving control information according to a second embodiment of the present invention.

FIG. 5 is a flowchart for a method of receiving control information according to a second embodiment of the present invention.

According to a second embodiment of the present invention, a mobile station receives downlink control information from one of a plurality of coordinated base stations. In this case, the base station, which transmits downlink control information, is named a serving base station. And, the serving station can be determined after an initial access of a mobile station. A plurality of the cells coordinated in CoMP mode of the mobile station share data and scheduling information with each other. And, a cell having a best downlink channel status transmits downlink data to the mobile station.

Referring to FIG. 5, a mobile station receives downlink control information from a serving base station [S510].

In this case, the downlink control information includes information on a cell which transmits the downlink data with a best downlink channel status among a plurality of cells coordinated in a CoMP mode of the mobile station.

The downlink control information can include a cell ID of the cell that transmits the downlink data or can indicate a cell that transmits the downlink data using a precoding matrix.

A case of indicating a downlink data using a precoding matrix is explained as follows.

First of all, assume that MIMO transmission, in which a plurality of cells coordinated in the CoMP mode of the mobile station apply precoding cooperatively, is performed. If there are two cells coordinated in the CoMP mode of the mobile station and each of the two cells has two transmitting antennas, there are total four transmitting antennas. And, it is able to design that cell selection information is included in a precoding matrix that uses four transmitting antennas.

For instance, when a rank is 1, if such a precoding matrix as {[1 1 0 0], [1 −1 0 0], [1 j 0 0], [1 −j 0 0], [0 0 1 1], [0 0 1 1], [0 0 1 j], [0 0 1 −j]} is added, it brings an effect as if information on a cell selected from two cells is transmitted. If a precoding matrix corresponding to another rank is designed by the same principle, it is able to transmit information related to the selected cell.

Meanwhile, the mobile station receives the downlink data from the cell having the best channel status using the received downlink control channel(s) [S520].

Subsequently, the mobile station transmits uplink control information (S630). In this case, the uplink control information includes ACK/NACK for the downlink data, a CQI indicating a channel status in downlink and a scheduling request (hereinafter abbreviated SR).

The mobile station uses a base sequence of the serving base station as a base sequence of CAZAC sequence, determines a cyclic shift value using a first CCE index of the downlink control channel transmitted by the serving base station, and then transmits ACK/NACK for the received downlink data. And, a position of a frequency region used for the transmission of the ACK/NACK and an orthogonal cover are determined according to the first CCE index of the downlink control channel transmitted by the serving base station.

The mobile station uses the base sequence of the serving base station as the base sequence of the CAZAC sequence and then transmits the CQI and the SR via the position of the frequency region previously determined by the serving base station using the cyclic shift value previously reserved by the serving base station.

In the following description, a method of receiving control information according to a third embodiment of the present invention is explained with reference to FIG. 6.

Figure 6:
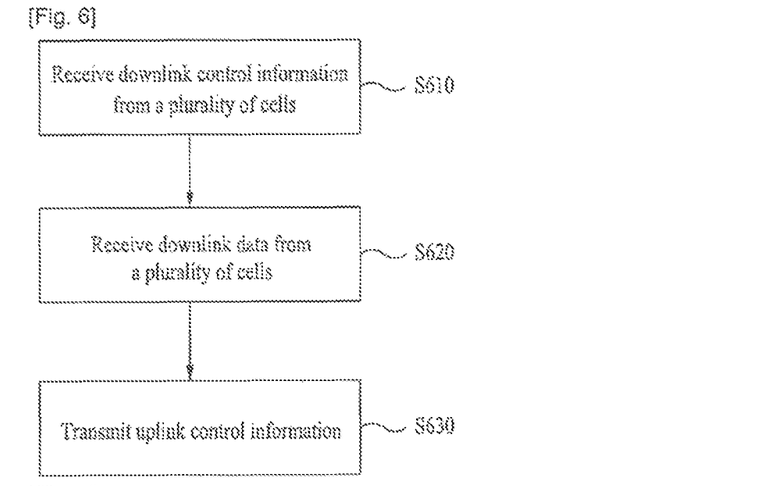
FIG. 6 is a flowchart for a method of receiving control information according to a third embodiment of the present invention.

FIG. 6 is a flowchart for a method of receiving control information according to a third embodiment of the present invention.

According to a third embodiment of the present invention, a mobile station receives downlink control information from all or a portion of a plurality of cells coordinated in a CoMP mode of the mobile station. The cell having transmitted the downlink control information transmits downlink data to the mobile station. In doing so, a plurality of coordinated base stations share data and control information with each other.

Referring to FIG. 6, a mobile station receives downlink control information from a plurality of cells [S610].

Each of a plurality of the cells transmitting the downlink data to the mobile station transmits downlink control information to the mobile station.

The mobile station receives the downlink data from a plurality of the cells using a received downlink control channel [S620].

For instance, in case that two cells transmit downlink control information and downlink data to a mobile station, if a first cell allocates a resource of a specific frequency region to the mobile station, a second cell may not allocate the region to mobile stations of the second cell. Yet, if the second cell allocates a resource to the mobile station by having the resource avoid being overlapped with the former resource allocated by the first cell and the first cell does not allocate the corresponding region to mobile stations of the first cell, the mobile station has many resources allocated thereto with the coordination between the first and second cells and is then able to receive data. In case of determining that influence of an adjacent cell is not meaningful (e.g., a center of a cell, etc.), the first and second cells can allocate a resource used by another cell to the mobile station.

Subsequently, the mobile station transmits uplink control information [6530]. In this case, the uplink control information includes ACK/NACK for the downlink data, a CQI indicating a channel status in downlink and a scheduling request (hereinafter abbreviated SR).

As mentioned in the foregoing description, a base sequence of CAZAC sequence used in transmitting ACK/NACK differs for each cell and a used cyclic shift value is determined according to a first CCE index of CCEs carrying a downlink control channel. A base sequence of CAZAC sequence used in transmitting CQI differs for each cell as well. And, a cyclic shift value to be used and a position of a frequency region are reserved by a base station in advance.

According to the third embodiment of the present invention, ACK/NACK and CQI can be transmitted in a following manner.

First of all, an ACK/NACK transmitting method is explained. A base sequence of a serving base station among a plurality of base stations having transmitted downlink control channels to a mobile station is used as a base sequence of a CAZAC sequence. And, it is able to transmit ACK/NACK using a cyclic shift value, which is determined according to a CCE index of the downlink control channel of the serving base station, an orthogonal cover and a frequency region.

Alternatively, a mobile station is able to transmit ACK/NACK for downlink data transmitted from each of a plurality of cells using a base sequence of each of a plurality of the cells, a cyclic shift value, which is determined according to a CCE index of a downlink control channel of each of a plurality of the cells, an orthogonal cover and a frequency region. In this case, if acknowledgements/non-acknowledgements (ACKs/NACKs) for a plurality of the cells are simultaneously transmitted, it may violate a single carrier property.

Secondly, a CQI transmitting method is explained as follows.

In case that CQI information on downlink channels of a plurality of cells is simultaneously transmitted, a base sequence of a serving base station in a plurality of cells having transmitted downlink control channels to a mobile station is used as a base sequence of a CAZAC sequence and it is able to transmit CQI information using a cyclic shift value reserved by the serving base station in advance. In this case, the transmitted CQI information includes all CQI information of a plurality of the cells.

Alternatively, a mobile station is able to transmit a CQI of a downlink channel of each of a plurality of cells using a base sequence of each of a plurality of the cells and a cyclic shift value and frequency resource reserved by each of a plurality of the cells.

In case that CQI information on a downlink channel of each of a plurality of cells is transmitted at a different time, a CQI of a downlink channel of each of a plurality of the cells is transmitted using a base sequence of each of a plurality of the cells and a cyclic shift value and frequency resource reserved by each of a plurality of the cells in advance.

And, the mobile station transmits an SR via the frequency resource pre-designated using the base sequence of the serving base station and the cyclic shift value reserved by the serving base station in advance.

In the following description, a method of receiving control information according to a fourth embodiment of the present invention is explained with reference to FIG. 7.

Figure 7:
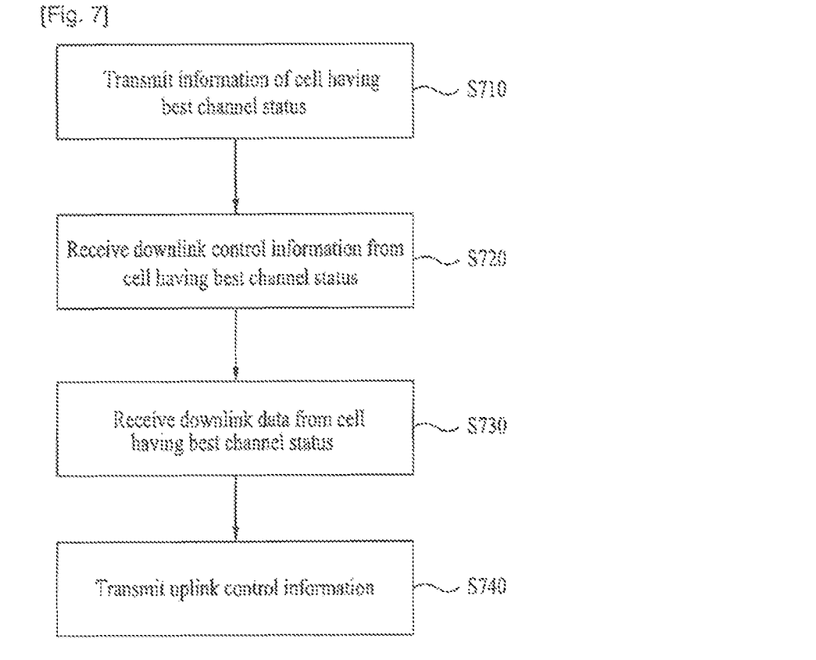
FIG. 7 is a flowchart for a method of receiving control information according to a fourth embodiment of the present invention.

FIG. 7 is a flowchart for a method of receiving control information according to a fourth embodiment of the present invention.

According to a fourth embodiment of the present invention, a mobile station transmits information on a cell having a best channel status among a plurality of cells coordinated in a CoMP mode of the mobile station and then receives downlink control information and downlink data from the cell having the best channel status.

Referring to FIG. 7, a mobile station transmits information on a cell having a best channel status among a plurality of cells coordinated in a CoMP mode of the mobile station [S710].

In transmitting the information on the cell having the best channel, the mobile station transmits a cell ID of the cell having the best channel status or the information on the cell having the best channel status using an index of a precoding matrix.

When MIMO transmission, in which a plurality of cells apply precoding cooperatively, is performed, it is able to indicate a cell having a good downlink channel status using an index of a precoding index.

For instance, if there are two coordinated cells and each of the two cells has two transmitting antennas, there are total four transmitting antennas. In this case, it is able to design that cell selection information is included in a precoding matrix that uses four transmitting antennas. For example, when a rank is 1, if such a precoding matrix as {[1 1 0 0], [1 −1 0 0], [1 j 0 0], [1 −j 0 0], [0 0 1 1], [0 0 1 1], [0 0 1 j], [0 0 1 −j]} is added, it is able to transmit information on a selected one of the two cells using an index of the precoding matrix. If a precoding matrix corresponding to another rank is designed by the same principle, it is able to transmit information related to the selected cell.

The mobile station receives downlink control information from the cell having the best channel status [S720] and then receives downlink data from the corresponding cell [S730].

Subsequently, the mobile station transmits uplink control information [S740]. In this case, the uplink control information includes ACK/NACK for the downlink data, a CQI indicating a channel status in downlink and an SR.

The mobile station uses a base sequence of the cell having the best channel status as a base sequence of a CAZAC sequence, determines a cyclic shift value using a CCE index of a downlink control channel transmitted by the cell having the best channel status, and then transmits the ACK/NACK for the received downlink data. And, a position and orthogonal cover of a frequency region used for the transmission of the ACK/NACK are determined according to a first CCE index of the downlink control channel transmitted by the cell having the best channel status.

The mobile station uses a base sequence of the cell having the best channel status as a base sequence of a CAZAC sequence and then transmits a CQI and SR via a position of a frequency region pre-designated by the cell having the best channel status using a cyclic shift value reserved by the cell having the best channel status in advance.

Figure 8:
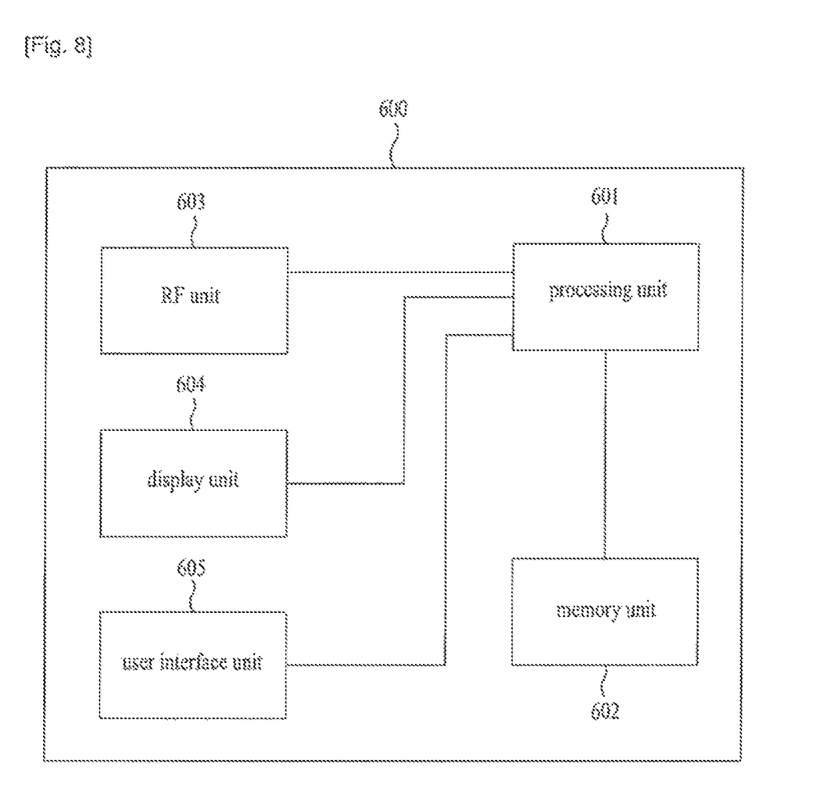
FIG. 8 is a block diagram for a configuration of a device applicable to a user equipment or base station for performing the present invention.

FIG. 8 is a block diagram for a configuration of a device applicable to a user equipment or base station for performing the present invention. Referring to FIG. 8, a device 600 includes a processing unit 601, a memory unit 602, an RF (radio frequency) unit 603, a display unit 604 and a user interface unit 605. A layer of a physical interface protocol is performed by the processing unit 601. The processing unit 601 provides a control plane and a user plane. A function of each layer can be performed by the processing unit 601. The memory unit 602 is electrically connected to the processing unit 601. And, an operating system, applications and general files are stored in the memory unit 602. If the device 600 is a user equipment, the display unit 604 is able to display various kinds of informations. And, the display unit 604 can be implemented using a well-known LCD (liquid crystal display), an OLED (organic light emitting diode) display and the like. The user interface unit 605 can be configured by being combined with such a well-known user interface as a keypad, a touchscreen and the like. The RF unit 603 is electrically connected to the processing unit 601. The RF unit 603 transmits or receives a radio signal.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

The invention claimed is:

1. A method for receiving control information by a user equipment in a wireless communication system, the method comprising:

when a plurality of cells are configured for the user equipment, receiving downlink control information from a first cell of the plurality of cells, wherein the downlink control information comprises an identifier (ID) of a second cell which transmits downlink data among the plurality of cells, and receiving the downlink data from only the second cell among the plurality of cells without an access procedure with the second cell using the downlink control information.

2. The method of claim 1, wherein the first cell corresponds to a serving cell, and the second cell corresponds to a coordinated cell.

3. The method of claim 1, further comprising:

transmitting a physical uplink control channel (PUCCH) including ACK/NACK information associated with the downlink data, wherein the PUCCH is transmitted based on a cyclic shift value corresponding to a first control channel element (CCE) index.

4. The method of claim 1, wherein the second cell corresponds to a cell having a best channel condition among the plurality of cells.

5. A user equipment for receiving control information in a wireless communication system, the user equipment comprising:

a radio frequency (RF) unit; and a processor configured to:

when a plurality of cells are configured for the user equipment, control the RF unit to receive downlink control information from a first cell of the plurality of cells, wherein the downlink control information comprises an identifier (ID) of a second cell which transmits downlink data among the plurality of cells, and control the RF unit to receive the downlink data from only the second cell among the plurality of cells without an access procedure with the second cell using the downlink control information.

6. The UE of claim 5, wherein the first cell corresponds to a serving cell, and the second cell corresponds to a coordinated cell.

7. The UE of claim 5, wherein the processor is configured to control the RF unit to transmit a physical uplink control channel (PUCCH) including ACK/NACK information associated with the downlink data, wherein the PUCCH is transmitted based on a cyclic shift value corresponding to a first control channel element (CCE) index.

8. The UE of claim 5, wherein the second cell corresponds to a cell having a best channel condition among the plurality of cells.

* * * * *